United States Patent [19]

Carrera

[11] Patent Number: 5,025,929

[45] Date of Patent: Jun. 25, 1991

[54] AIR CLASSIFIER FOR LIGHT REUSABLE MATERIALS SEPARATION FROM A STREAM OF NON-SHREDDED SOLID WASTE

[75] Inventor: Pietro Carrera, Rocca di Papa, Italy

[73] Assignee: Sorain Cecchini Recovery, Incorporated, Fairfax, Va.

[21] Appl. No.: 390,283

[22] Filed: Aug. 7, 1989

[51] Int. Cl.⁵ .......................... B03B 7/00; B07B 9/02
[52] U.S. Cl. ...................................... 209/19; 209/20; 209/24; 209/32; 209/152
[58] Field of Search ...................... 209/20, 19, 12, 44, 209/134, 135, 142, 154, 152, 32, 33, 11, 24, 25

[56] References Cited

U.S. PATENT DOCUMENTS

| | | | |
|---|---|---|---|
| 132,577 | 10/1872 | Hillman | 209/152 |
| 3,113,099 | 12/1963 | Schmitz | 209/135 |
| 3,447,678 | 6/1969 | Henry | 209/12 |
| 4,107,034 | 8/1978 | Paterson et al. | 209/135 |
| 4,150,632 | 4/1979 | Matthews | 209/135 X |
| 4,278,532 | 7/1981 | Birch et al. | 209/19 |
| 4,853,112 | 8/1989 | Brown | 209/135 |

FOREIGN PATENT DOCUMENTS

| | | | |
|---|---|---|---|
| 2157409 | 5/1975 | Fed. Rep. of Germany | 209/135 |
| 975556 | 3/1951 | France | 209/12 |
| 479267 | 3/1953 | Italy | 209/20 |
| 128383 | 10/1926 | Switzerland | 209/12 |

Primary Examiner—Donald T. Hajec
Attorney, Agent, or Firm—Cushman, Darby & Cushman

[57] ABSTRACT

An air classifier for separating light reusable materials from a stream of non-shredded solid waste is provided. The air classifier employs two operating phases. The first operating phase, the desired light fraction is entrained in an air stream and is conveyed above the remainder of the solid waste. The waste material is then received by a second conveyor so that the lighter fraction is received on top of the heavier fraction. Thus, the first phase of the apparatus effects mass stratification. During the second operating phase, the light fraction is actually removed from the heavy fraction by a high velocity air stream which is preferably induced by a reducing cross-section portion of the apparatus. The air flow through the apparatus is captured and recycled and the light fraction being separated therefrom in, for example, a cyclone.

19 Claims, 6 Drawing Sheets

AIR CLASSIFIER FOR LIGHT REUSABLE MATERIALS SEPARATION FROM A STREAM OF NON-SHREDDED SOLID WASTE

BACKGROUND OF THE INVENTION

1. Field of the Invention

The present invention relates to solid waste processing and, in particular, to an air classifier for light reusable materials separation from a stream of non-shredded municipal, commercial, and/or industrial solid waste.

2. Description of the Related Art

The magnitude of problems associated with the disposal of municipal, commercial, and industrial wastes is well known both from the stand point of environmental impact and costs to the community.

In order to reduce environmental impact, minimize costs and safe guard exhaustible resources, the concept of reutilizing certain components of solid waste has become more widely accepted and has been implemented in certain areas to the extent that current technology allows and subject to acceptable cost limits.

It is also known that certain components can be selected or separated from a stream of waste by means of special equipment which exploit the particular physical characteristics of the particular materials contained in the waste. One example of such special equipment is the air classifier. To date, air classification has been used to separate combustible materials from previously shredded waste.

Air classification is based on an interaction between a moving air stream and shredded solid waste which occurs within a column. The interaction process is effected by subjecting the particles to a force which is opposed to the fall of the particles under the influence of gravity. As a result, waste flow is divided into two portions. A first portion is called the "light" fraction which includes concentrated fragments of paper and cardboard as well as plastic film. The second component of the divided waste is referred to as the "heavy" fraction which mostly consists of glass, stone, and ferrous metals.

There are many air classifiers currently employed in the industry having different designs but all based on the basic principals noted above. The various air classifier utilized in the industry can be subdivided into four categories. The first is horizontal units which consist of a horizontal duct through which an air stream is directed. Shredded waste is fed to the duct and air drags the light fraction, letting the heavy fractions fall down through an outlet of the horizontal duct. Thus, such an air classifier is a pneumatic haulage system in which air speed is studied so that only the light fraction is carried by the air stream. An air classifier of this type is shown in FIG. 1.

A second type of air classifier is the vertical unit. Vertical units can have varying shapes but are substantially characterized by a vertical duct through which an air stream is directed and shredded waste is fed. Thus, the particles within the vertical duct are subjected to opposite forces due to which the heavy components of the solid waste fall towards the bottom and the light fraction follows the air stream. The vertical ducts are configured or shaped so as to increase the efficiency of the separation process. Examples of vertical ducts are shown in FIGS. 2 and 3. FIG. 2 shows a simpler version of a vertical duct whereas FIG. 3 shows a zig-zag shaped vertical duct.

The third type of air classifier is known as the inclined vibrating unit. The characteristics of inclined units are similar to the horizontal and vertical units described above. Specifically, the inclination of the unit facilitates the advance of the shredded waste through the system while the air stream entrains the light fraction. Vibrating units are similar to horizontal units except that a smaller part of air is introduced into the duct together with the waste material to be classified and most of the air is introduced below the inclined vibrating surface. An air classifier of the inclined vibratory type is shown in FIG. 4.

The fourth type of air classifier currently employed in the industry is the rotating unit. In rotating units, a primary duct in the form of a rotating cylinder receives the shredded waste and an air stream passes through the cylinder to carry away the light fraction. More particularly, the waste is fed to the cylinder from the lower part thereof by means of a belt conveyor. The air stream runs across the cylinder from its lower part to its upper part. A decantation chamber for the light fraction of the waste is disposed adjacent the upper part of the cylinder and receives the light fraction together with the air flow. The heavy fraction falls down along the cylinder slope and is discharged from the lower part of the cylinder. An example of a rotating unit is shown in FIG. 5.

Accordingly, the separation processes performed by the above-described air classifier are nothing but a rough subdivision where the light portion has a higher percentage of paper materials and the heavy portion has a higher percentage of glass, ceramics, stones, and metals. Considering that when employing such prior art classifiers, the input waste is shredded and then thoroughly mixed, such air classifiers are inappropriate for recycling i.e. recovering and reutilizing, specific waste components. Rather, the classified light, combustible fraction is simply burned.

SUMMARY OF THE INVENTION

It is an object of the present invention to provide an air classification device which is capable of performing an effective separation of a light fraction from the solid waste having determined specific characteristics and consisting exclusively of plastic film and very light paper. It is the further object of the present invention to provide an air classification system which does not mix up the waste so that further material specific classification and/or recycling is possible.

It is known that when handling a very heterogenous waste mass, that is solid refuse which has not undergone any homogenization process such as a shredding action, then, heavier and oversized items tend to detain and entrain lighter items such as plastic film and light paper. The entrainment of these lighter materials prevents the air stream effect which should remove them from the mass flow.

The present invention resides in the fundamental principal that the raw waste stream is prepared prior to dividing it into two different fractions of materials.

More particularly, the air classifier of the invention has two operating phases. During the first operating phase, the desired light fraction is removed from the remainder of the mass flow and is conveyed on a belt conveyor above the remainder of the solid waste. During this phase, then, the equipment of the invention provides for mass stratification. Subsequently, during the second phase of operation the equipment provides for the actual division of heavy and light fractions.

In order to achieve the objects of the invention and to carry out the two operating phases in accordance with the invention, the air classifier of the invention comprises several components. A first component of the invention is a rotating cylinder inside which the solid waste material is kept moving while an air stream in the same direction as that in which the waste is conveyed passes through the cylinder causing the accelerated advancement of the light fraction of the solid waste. The rotating drum provided in accordance with the present invention may be a rotating screen which can simultaneously provide fine fraction separation. When the light fraction reaches the outlet of the cylinder, it is distributed over the heavier fraction which is being gathered in the meanwhile on a belt conveyor. Actually, the heavier materials remain stratified over the lower part of the belt conveyor whereas the lighter fraction is only present in the upper layer.

The belt conveyor feeds the previously stratified material inside an air classifier duct which consists of a large housing of variable section that encloses the outlet of the rotating drum as well as the entire belt conveyor. The housing collects all the air from the rotating drum and other auxiliary sources and conveys it to the exact point where the separation of the light fraction is performed.

The air classifier duct of the invention has a "Venturi" shape. Because of the Venturi shape of the duct, it is possible to create the air pressure and speed conditions required for carrying away the light fraction together with the air while allowing the heavy fraction to continue its run towards the outlet of the duct.

A light fraction separation system is further provided for separating the light fraction of the waste from the classifying air.

Further, an air recirculation system is provided within the processing unit itself so as to minimize the amount of air that must be filtered and to avoid uncontrolled air emissions from the system.

The air classifier provided in accordance with the present invention and having the components set forth above provides numerous advantages. For example, the apparatus of the invention allows solid waste, whether household, commercial, or industrial, to be classified without requiring that the waste be previously shredded. Therefore, it is possible to recover light materials from the solid waste flow while maintaining the physical characteristics of the solid waste so that the light component of the waste is not contaminated by the remainder of the waste as can happen with a shredder.

Furthermore, the air classifier of the invention provides for virtually exclusive separation of acceptable light materials due to the fact that the stratification of the materials allows the air stream to solely affect the light fraction without having an effect on the remainder of the waste which is concentrated in the lower layer.

The air classification apparatus of the invention also allows low power consumption since only a small portion of the force required for the separation process is an aerodynamic force, most of the required force being purely mechanical and supplied by the rotating drum.

Other objects, features, and characteristics of the present invention, as well as the methods of operation and functions of the related elements of the structure, and the combination of parts and economies of manufacture, will become more apparent upon consideration of the following detailed description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

Figure 1:
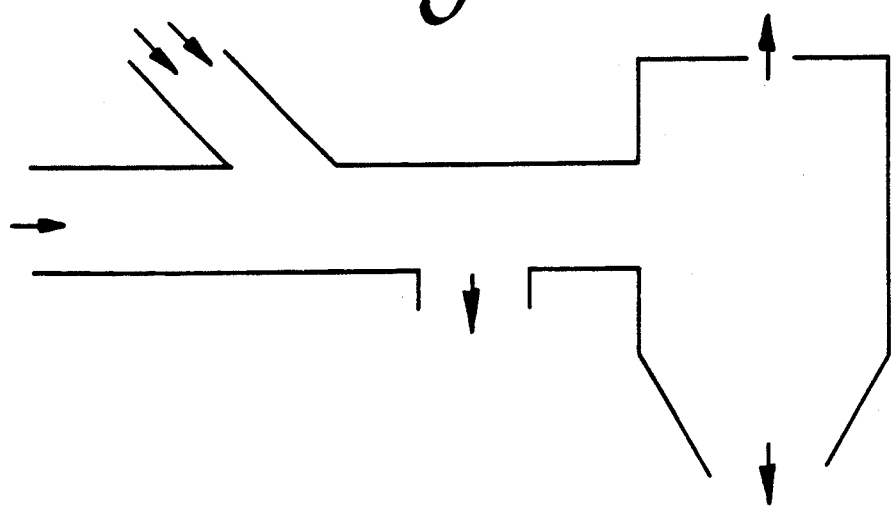
FIG. 1 is a schematic view of a horizontal air classifier.
Figure 2:
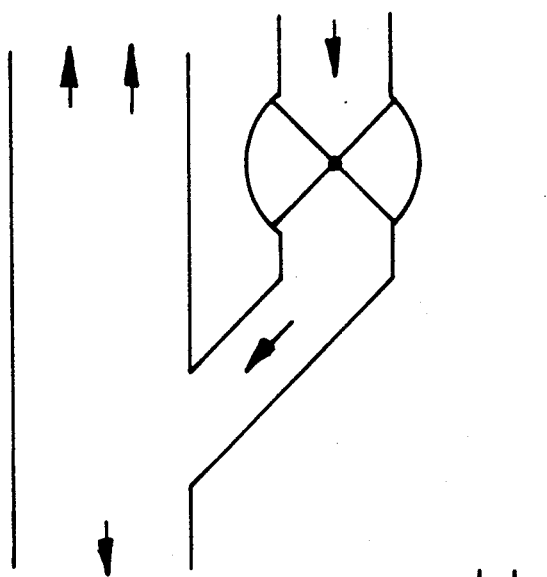
FIG. 2 is a schematic elevational view of a simple vertical air classifier.
Figure 3:
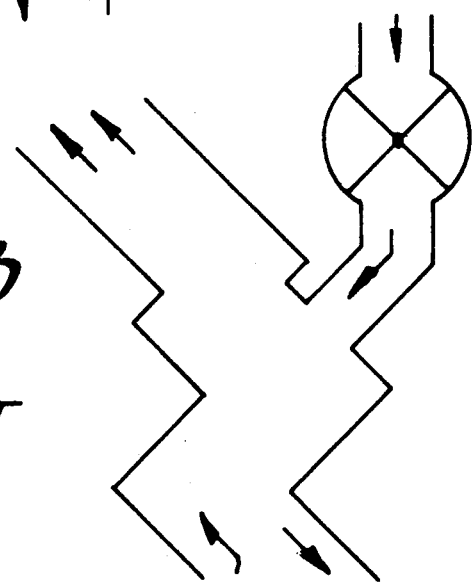
FIG. 3 is a schematic elevational view of a vertical air classifier having a zig-zag shaped
Figure 4:
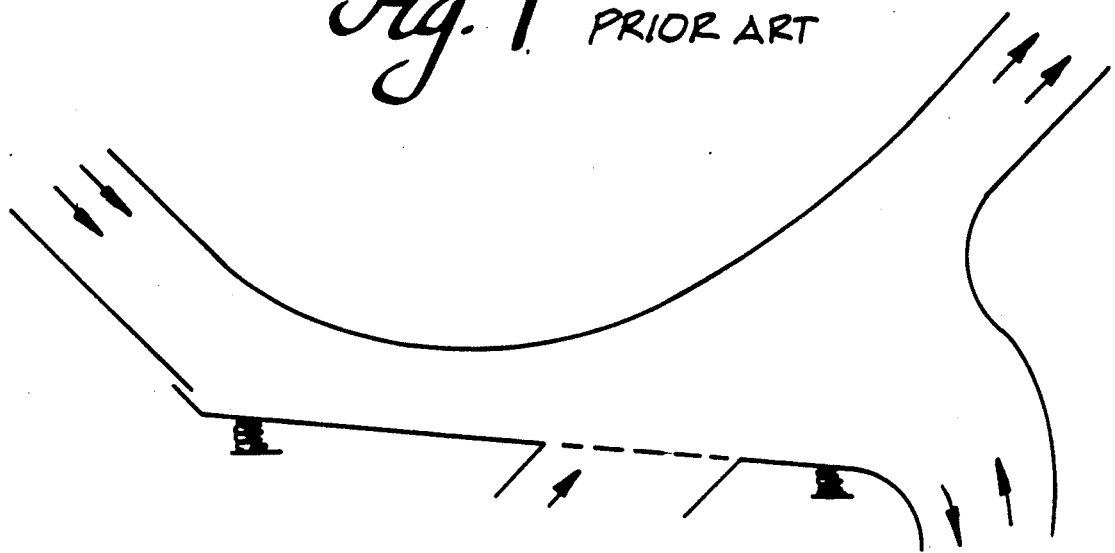
FIG. 4 is a schematic elevational view of an inclined vibrating air classifier.
Figure 5:
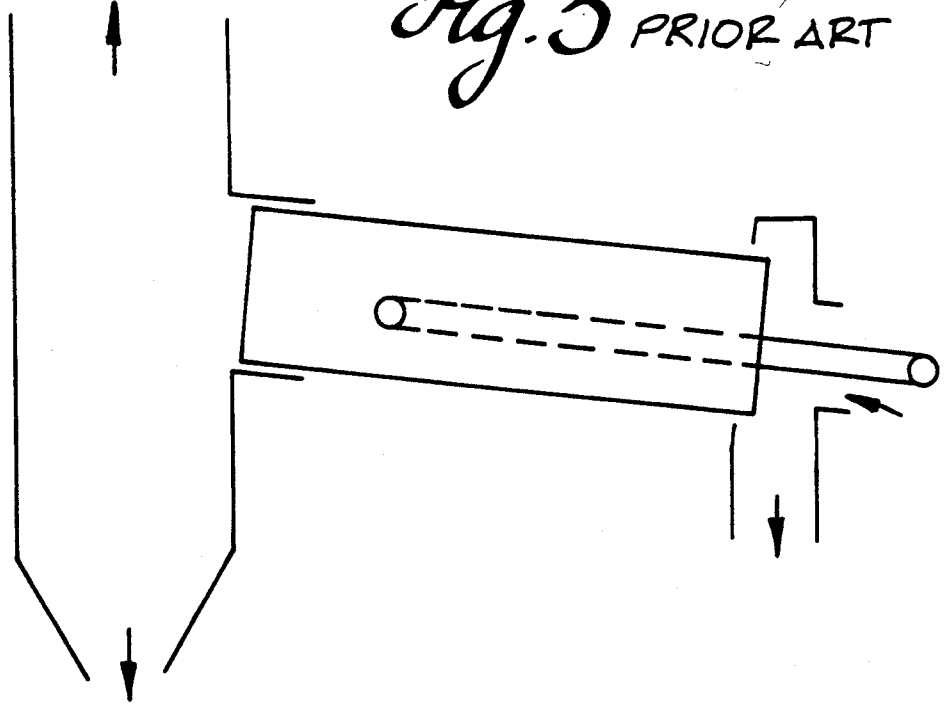
FIG. 5 is a schematic elevational view of a rotating air classifier.

As shown in FIGS. 6-9, the air classifier 10 provided in accordance with the present invention includes a rotating drum 12 into which both solid waste to be classified and air are fed, a belt conveyor 36 which collects material from the outlet end 34 of the rotating drum 12 and a housing 42 which defines an air duct.

Figure 6:
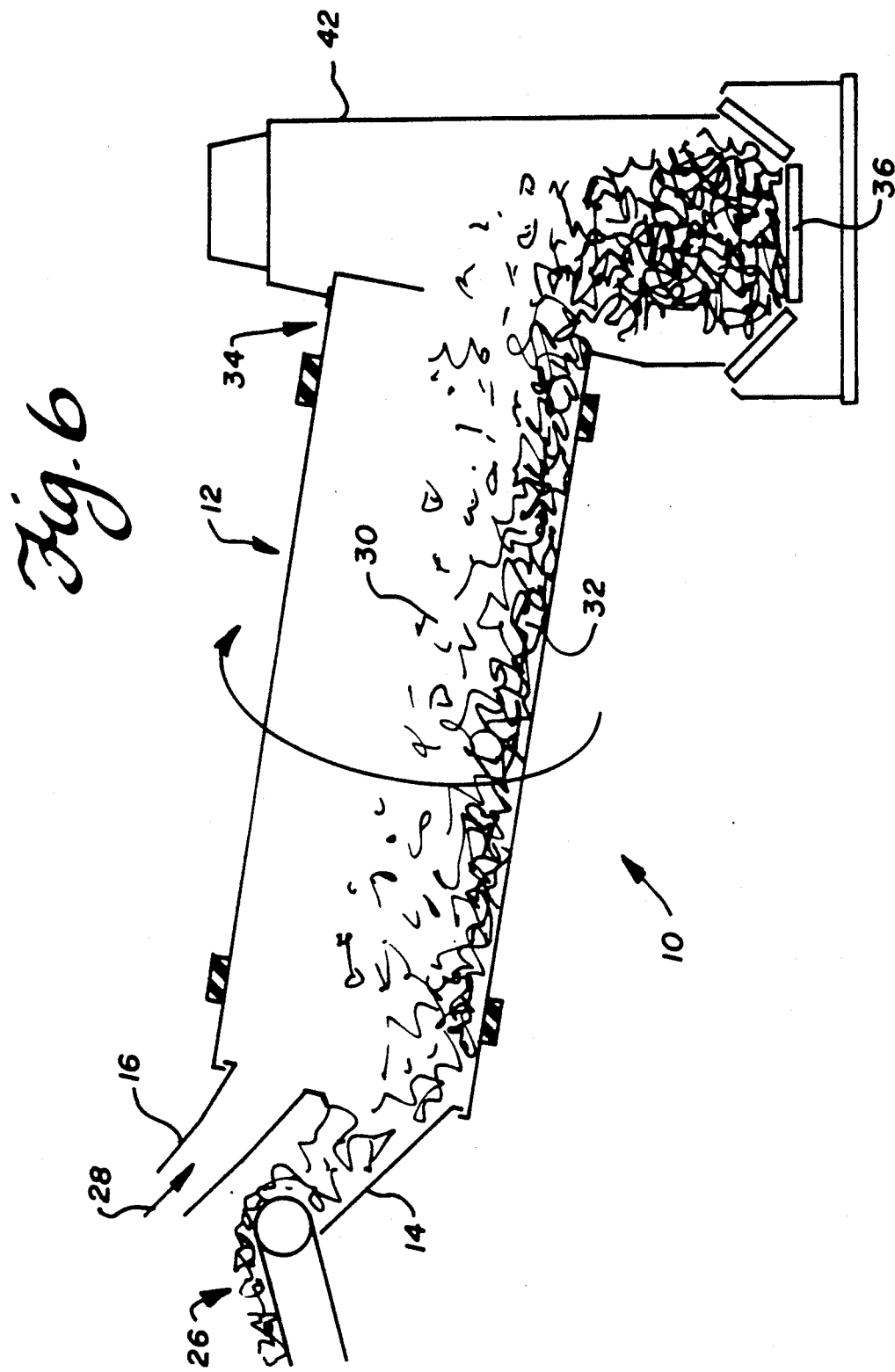
FIG. 6 is a schematic side elevational view of an apparatus provided in accordance with the present invention.

As is shown in FIG. 6, the rotating drum 12 provided in accordance with the present invention is mounted so as to be disposed in a generally downwardly inclined orientation so as to enhance advancement of the material therethrough. An inlet 14 for solid waste is defined at a first, upper end of the rotating drum 12. An air inlet 16 is also defined at the first end of the rotating drum. Thus, both the solid waste and the air stream move through the drum from the upper end thereof to the lower end. The rotating drum as shown in the embodiment of FIG. 6 is formed from, for example, an elongated metal or plastic tube.

Figure 7:
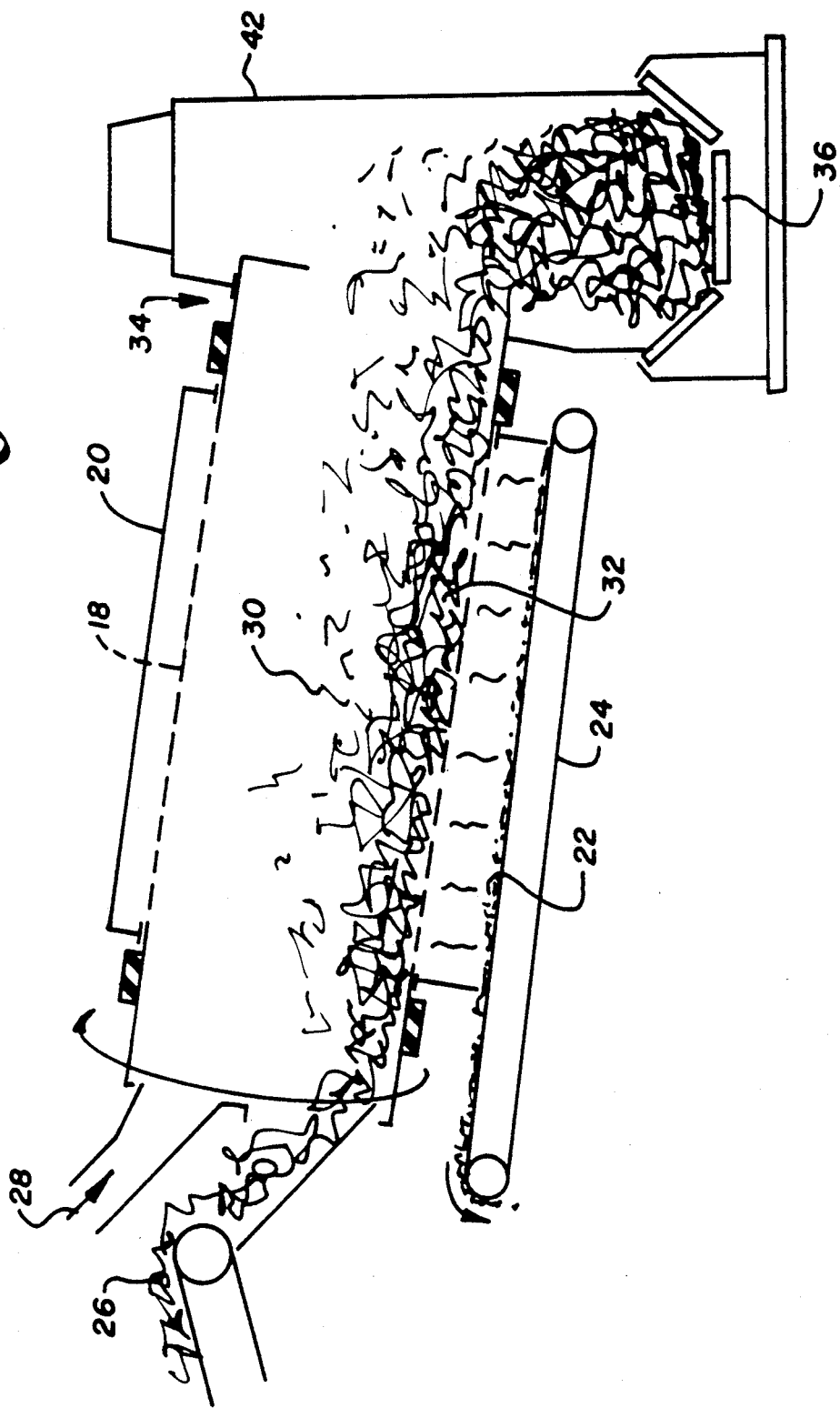
FIG. 7 is a schematic side elevational view of an alternative embodiment of an apparatus provided in accordance with the present invention.

In the alternative, as shown in FIG. 7, the drum can be formed from a perforated plate 18 which is completely enclosed in a housing 20. The housing 20 is fixed whereas the perforated plate 18 defining the drum is rotatable for stratifying the solid refuse and for sifting the fine fraction 22 of the refuse material. A conveyor belt 24 or the like is mounted vertically below the rotating drum 18 for receiving the fine fraction 22 of the waste and conveying the same to further processing equipment (not shown).

In the embodiment of FIG. 7, the rigid housing 20 together with the belt conveyor 24 define an air classification air duct in the region of the perforated drum 18. While material screening as shown in FIG. 7 is not required for the light fraction separation process, it can be useful to employ the drum for performing further material separation, particularly when the process cycle includes the selection of other components such as glass or metal from the waste flow.

Referring again to FIG. 6, in particular, the unshredded waste material 26 which is fed through the inlet 14 flows through the drum 12. The rotation of the drum 12 causes the unshredded refuse to be lifted upwards and dropped repeatedly while the air stream 28 introduced through air inlet 16 encounters the moving waste material.

Unshredded refuse 26 is added to the rotating drum 12 so that the drum 12 is only partially filed. Preferably, 10 to 50 percent of the volume of the drum 12 contains refuse at any time. In the remaining volume of the drum 12, the light material 30 entrained in the air stream 28 moves more rapidly than the remaining heavy fraction 32 towards the drum outlet opening 34. Simultaneously, the heavier fraction 32 conveyed through the rotating drum 12 is transferred to a belt conveyor 36 mounted vertically below the outlet opening 34 of the rotating drum 12. The light material 30 entrained in the air stream 28 is conducted to a point vertically above the belt conveyor 36 and the heavier refuse 32 thereon. In the illustrated embodiment, the belt conveyor 36 conveys the stratified waste materials 30, 32 in a direction which is substantially perpendicular to the direction of conveyance of the materials 30, 32 within the rotating drum !2. However, it is to be understood that the belt conveyor 36 could convey the stratified waste materials 30, 32 in a direction which is substantially parallel to the direction of conveyance of the materials within the drum !2 or at an angle relative thereto. However, it is preferred that the belt conveyor convey the waste materials in a direction which is substantially perpendicular to their conveyance within the rotating drum and, further, that the belt conveyor convey the material in a direction opposite to the rotation direction of the rotatable drum. Rotating to guide the material in a direction opposite to the belt conveyor advancement direction ensures that most of the duct is left free for the light fraction flow and that the light fraction will land on top of the heavy fraction rather than be covered by it (FIG. 8).

In order to complete the material stratification in accordance with the invention which is necessary for achieving a high-grade separation efficiency, a further airstream 38 is provided through inlet 40 parallel to the direction of belt conveyance and, in the illustrated embodiment, perpendicular to the flow of refuse from the drum 12. This air stream 38 liberates some components of the light fraction, such as cardboard and wood as the refuse falls from the rotating drum 12 to the belt conveyor 36. Thus, the supplemental air stream 38 removes light fraction materials which may otherwise be trapped within the heavy fraction 32. The supplemental air stream 38 has a velocity such that it carries the light fraction 30 only a short distance and then lets it fall down again over the already deposited heavy material layer 32.

Once the foregoing material stratification process is completed, the components can be separated in accordance with the present invention with a process which involves a minimal power expenditure.

Figure 8:
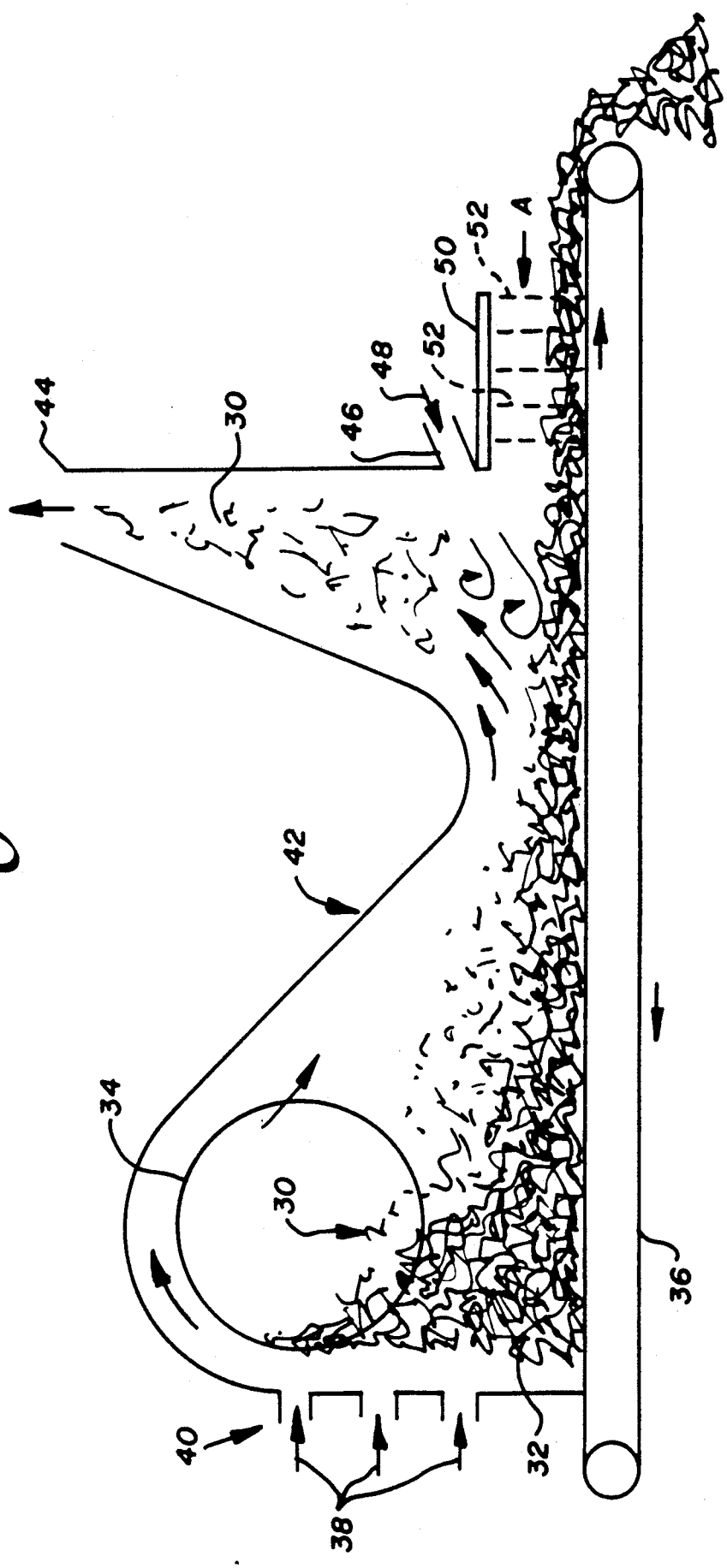
FIG. 8 is a schematic front view of an apparatus in accordance with the invention.

Indeed, as shown in FIG. 8, the housing 42 which receives the waste material 30, 32 and main and supplemental air flows 28, 38 defines an air duct which has a particular shape. Specifically, down stream from where the housing 42 encloses the drum outlet 34, the housing 42 is narrowed. This "Venturi" shape considerably increases the velocity of the air 28, 38 so that the air entrains and lifts the light fraction 30 vertically upwardly towards the outlet opening 44 of the housing 42. In order to even further enhance the separation in accordance with the invention, a further auxiliary air flow 48 can be provided through an inlet 46 which blows on the heavy fraction 32 as it moves forward and creates a whirlwind area which lifts up the last light particles and introduces them into the vertical stream.

The housing 42 further defines a heavy fraction outlet which is in the form of a duct 50 that follows the belt conveyor 36 and is equipped with a series of elastomeric wall elements 52 which allow the waste material to pass into and through the duct but minimize the air flow therethrough. Furthermore, as discussed more fully below, a slight vacuum is defined within the apparatus which tends to draw air in the direction shown by arrow A from the outermost end of the outlet duct 50 inwardly towards the inner end thereof to join the flow of air 28, 38, 48, through the housing 42 and out of the air outlet 44.

Figure 9:
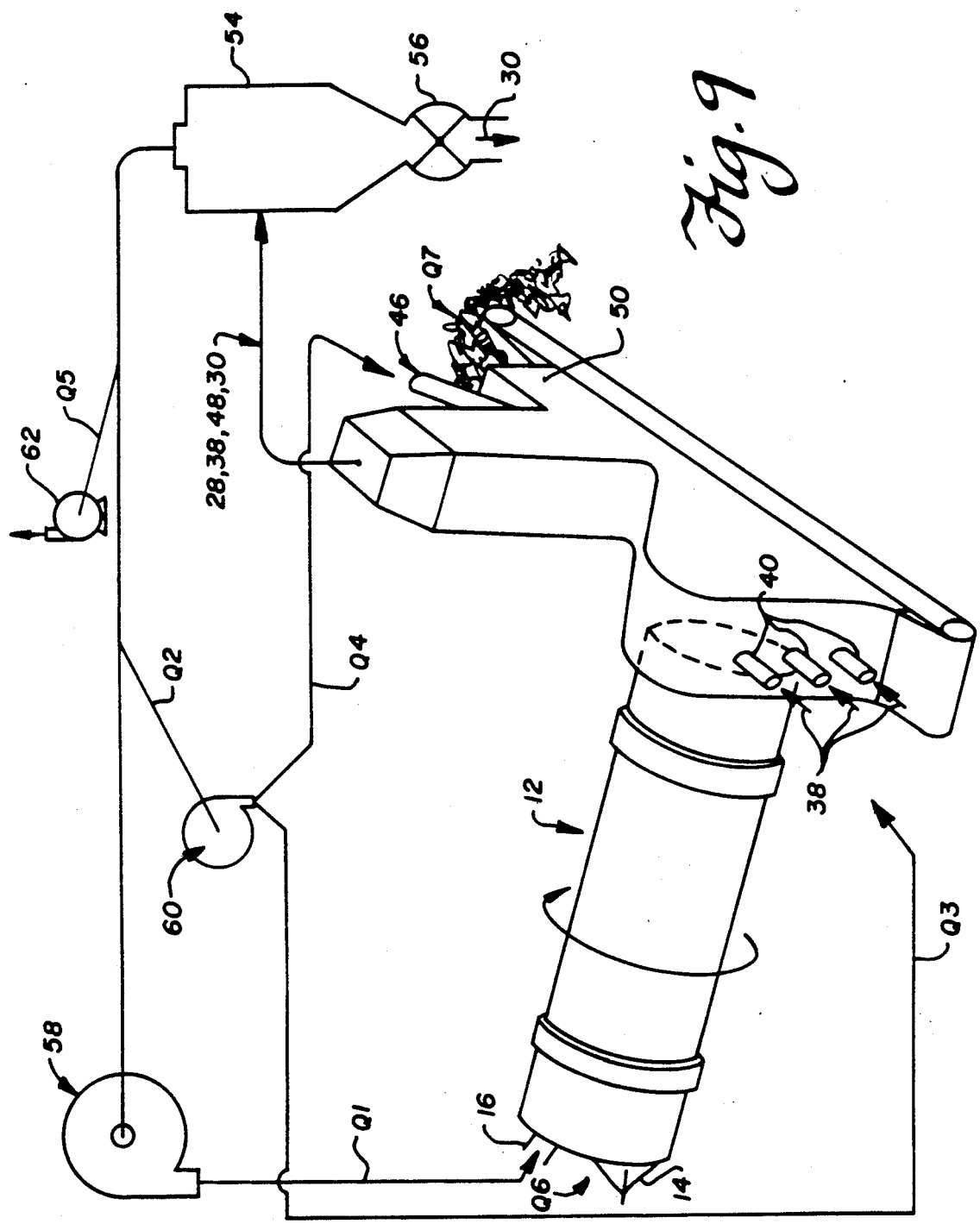
FIG. 9 is a schematic front perspective view of the apparatus of the present invention showing the operation of the system.

FIG. 9 shows the entire system of the invention including the air flow paths in accordance therewith. More particularly, the air 28, 38, 48, and light fraction 30 of the waste are conducted from the outlet 44 to a cyclone 54 which separates the air from the light fraction. The light fraction is then discharged through a rotary valve 56 or the like which closes the pneumatic circuit while allowing collection of the light fraction 30. A main fan 58 draws air from the decantation cyclone 54 and recycles that air to the rotary drum 12 through inlet 16. A secondary fan 60 draws a predetermined quantity of air from the cyclone 54 as well and recycles a portion of it through the supplemental air inlets 40. The remainder of the air flow generated by fan 60 is conducted through auxiliary air inlet 46. A third fan 62 also draws from the decantation cyclone 54. The air drawn by the third fan 62 is not recycled but is conveyed to a filtration system (not shown) and then released to ambient atmosphere. The balance of air introduced into the apparatus as air flows 28, 38, and 48 and extracted from the apparatus by fans 58, 60, and 62 is such that a slight vacuum is defined within drum 12 and housing 34 so as to avoid air emission and, thus, dust emission. The creation of a slight vacuum in the housing 34 also enhances removal of the light fraction 30 due to the inflow of air through the heavy waste outlet as described above.

Indeed, the air quantities which are fed into the apparatus include quantity Q1 which is fed into the inlet 16 of the rotary drum 12, and quantity Q2 which actually includes two air flows, Q3 which is the supplemental air flow 38 and Q4 which is the axially air flow 48. The quantity of air which is drawn out of the apparatus via the air outlet of the decantation cyclone 54 is the total of the air drawn by fan 58 which is equal to the air directed into the rotary drum Q1 plus the air drawn by fan 60 which equals the air flowing into the supplemental and auxiliary air inlets Q2 and further the air drawn by fan 62 and filtered for emission Q5. Thus, because more air is drawn from the cyclone 54 and hence from the apparatus 10 than is introduced through the three air inlets, 16, 40 and 46, a slight vacuum is generated within the housing. In order to balance the air flow, air is drawn into the apparatus from open portions in the apparatus and specifically through the waste inlet mouth 14, referred to as quantity Q6, as well through the heavy materials outlet mouth 50 (quantity Q7). Thus, in order for the system to be balanced, Q5 which is directed to atmosphere must equal the inflow through the waste inlet Q6 and the heavy materials waste outlet Q7.

Inflow air guarantees a speed of 3 to 7 mt/sec inside the rotating drum while the outflow air quantity Q1 + Q2 + Q5 guaranties a speed of 10 to 22 mt/sec in the narrow Venturi section of the duct. The air quantities Q3 and Q4 are variable dependent upon the nature of the light material to be processed.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claim.

What is claimed is:

1. An apparatus for separating a light fraction from solid, non-shredded waste material, comprising
    first conveying means for conveying waste material along a first conveyance path;
    first inlet means for delivering waste to be separated to said first conveying means;
    means for directing a first air stream to and along said first conveyance path in a direction of conveyance thereof so that light fraction materials in said delivered waste are entrained in said air stream and carried along said conveyance path vertically above a heavier fraction of said delivered waste;
    second conveying means for conveying waste material along a second conveyance path, said second conveying means receiving delivered waste material form the said first conveying means so that the delivered waste material falls down and is stratified on said second conveying means with said heavier fraction thereof disposed substantially adjacent said second conveying means and said light fraction thereof is disposed substantially vertically above heavier fraction; and
    a housing surrounding and enclosing at least said second conveying means and the delivered waste material thereon, said housing receiving said first air stream, so that said first air stream flows longitudinally therethrough, said housing having a heavier waste material outlet and an air outlet for air and light fraction waste material entrained therein, said housing defining an air duct extending longitudinally of said second conveying means, a vertical cross-section of said housing varying along the length of said second conveying means so that said air duct has a reduced cross-section along at least a portion of the length of said second conveying means whereby the velocity of air flowing through said duct increases at said reduced cross-section portion to thereby pick up and entrain light fraction material disposed on and above said second conveying means and conduct said light fraction through said air outlet.

2. An apparatus as in claim 1, further comprising second air inlet means defined adjacent a first end of said second conveying means for picking up and entraining light fraction fraction from the heavier materials conveyed from said first conveying means to said second conveying means.

3. An apparatus as in claim 1, further comprising a plurality of elastomeric curtain elements defined at said heavy material outlet for minimizing air flow therethrough while allowing the flow of heavy materials out of said housing.

4. An apparatus as in claim 1, wherein the cross-section of said housings reduced along the length of said second conveying means so as to speed up an air flow therethrough from 3 to 7 mt/sec to 10 to 22 mt/sec.

5. An apparatus as in claim 1, wherein said second conveyance path is disposed at an angle of about 90° relative to said first conveyance path.

6. An apparatus as in claim 1, wherein said first conveying means includes a perforated plate for conveying said waste whereby a fines fraction of the waste material is separated.

7. An apparatus as in claim 6, further comprising a third conveying means for receiving said fine fraction and conveying the same for further processing.

8. An apparatus as in claim 1, further comprising a cyclone means for separating said light fraction of the waste from the air flow, said cyclone means including a light fraction outlet and an air outlet.

9. An apparatus as in claim 8, further including an air-tight valve means mounted to said light fraction outlet for removing said light fraction from said cyclone.

10. An apparatus as in claim 9, further comprising first fan means for withdrawing a first portion of the air from the air outlet of said cyclone and conveying the first portion to said first air inlet means.

11. An apparatus as in claim 10, further comprising a second air inlet means defined adjacent a first end of said second conveying means for picking up and entraining light fraction materials from the heavier fraction conveyed from said first conveying means to said second conveying means, a third air inlet means defined in said housing adjacent a second end of said conveying means for further enhancing the entrainment of light fraction materials and removal thereof through the air flow outlet, and a second fan means for withdrawing a second portion of the air from the air outlet of said cyclone and conveying the second portion to said second and third air inlet means.

12. An apparatus as in claim 11, wherein said first and second fan means draw at least about 80% of the exhaust air from said cyclone means.

13. An apparatus as in claim 11, further comprising a third fan means for withdrawing a third portion of the air from the air outlet of said cyclone and exhausting the third portion to atmosphere.

14. An apparatus as in claim 13, wherein the air flow drawn by said first, second, and third fan means is greater than the air flow through said first, second, and third air inlet means.

15. An apparatus for separating a light fraction from solid, non-shredded waste material, comprising:
    first conveying means for conveying waste material along a first conveyance path;
    first inlet means for delivering waste to be separated to said first conveying means;
    means for directing a first air stream to and along said first conveyance path so that light fraction materials in said delivered waste are entrained in said air stream and carried along said conveyance path vertically above a heavier fraction of said delivered waste;
    second conveying means for conveying waste material along a second conveyance path, said second conveying means receiving delivered waste material from the said first conveying means so that the delivered waste material falls down and is stratified on said second conveying means with said heavier fraction thereof disposed substantially adjacent said second conveying means and said light fraction thereof is disposed substantially vertically above said heavier fraction;

a housing surrounding and enclosing at least said second conveying means and the delivered waste material thereon, said housing receiving said first air stream, so that said first air stream flows longitudinally therethrough, said housing having a heavier waste material outlet and an air outlet for air and light fraction waste material entrained therein;

second air inlet means defined adjacent a first end of said second conveying means for picking up and entraining light fraction materials from the heavier fraction conveyed from said first conveying means to said second conveying means; and a third air inlet means defined in said housing adjacent a second end of said second conveying means for further enhancing the entrainment of light fraction materials and removal thereof through the air flow outlet.

16. An apparatus for separating a light fraction from solid, non-shredded waste material, comprising:

first conveying means for conveying waste material along a first conveyance path;

first inlet mans for delivering waste to be separated to said first conveying means;

means for directing a first air stream to and along said first conveyance path so that light fraction materials in said delivered waste are entrained in said air stream and carried along said conveyance path vertically above a heavier fraction of said delivered waste;

second conveying means for conveying waste material along a second conveyance path, said second conveying means receiving delivered waste material from the said first conveying means so that the delivered waste material falls down and is stratified on said second conveying means with said heavier fraction thereof disposed substantially adjacent said second conveying means and said light fraction thereof is disposed substantially vertically above said heavier fraction; and a housing surrounding and enclosing at least said second conveying means and the delivered waste material thereon, said housing receiving said first air stream, so that said first air stream flows longitudinally therethrough, said housing having a heavier waste material outlet and an air outlet for air and light fraction waste material entrained therein, said first conveying means comprising a drum mounted for rotation relative to said housing, said rotatable drum being inclined so that delivered waste will flow therethrough under the influence of gravity, the waste being delivered to said rotating drum adjacent a first upper end thereof so that the waste material tumbles through said rotating drum from said upper end to a second, lower end thereof, said second conveying means receiving waste material adjacent said second, lower end of said rotating drum.

17. An apparatus as in claim 16, wherein said rotating drum comprises a rotating perforated plate whereby a fines fraction of waste material is separated from the waste material within said perforated rotating drum.

18. An apparatus for separating a light fraction from solid, non-shredded waste material, comprising:

first conveying means for conveying waste material along a first conveyance path;

first inlet means for delivering waste to be separated to said first conveying means;

means for directing a first air stream to and along said first conveyance path so that light fraction materials in said delivered waste are entrained in said air stream and carried along said conveyance path vertically above a heavier fraction of said delivered waste;

second conveying means for conveying waste material along a second conveyance path, said second conveying means receiving delivered waste material from the said first conveying means so that the delivered waste material falls down and is stratified on said second conveying means with said heavier fraction thereof disposed substantially adjacent said second conveying means and said light fraction thereof is disposed substantially vertically above said heavier fraction;

a housing surrounding and enclosing at least said second conveying means and the delivered waste material thereon, said housing receiving said first air stream, so that said first air stream flows longitudinally therethrough, said housing having a heavier waste material outlet and an air outlet for air and light fraction waste material entrained therein;

a second air inlet means defined adjacent a first end of said second conveying means for picking up and entraining light fraction materials from the heavier fraction conveyed from said first conveying means to said second conveying means;

cyclone means for separating said light fraction of the waste form the air flow, said cyclone means including a light fraction outlet and an air outlet;

an air-tight valve means mounted to said light fraction outlet for removing said light fraction from said cyclone;

first fan means for withdrawing a first portion of the air from the air outlet of said cyclone and conveying the first portion to said first air inlet means; and a second fan means for withdrawing a second portion of the air from the air outlet of said cyclone and conveying the second portion to at least said second air inlet means.

19. An apparatus as in claim 18, further comprising a third air inlet means defined in said housing adjacent a second end of said conveying means for further enhancing the entrainment of light fraction materials and removal thereof through the air flow outlet, said second portion of the air from the air outlet of said cyclone being conveyed to said second and third air inlet means, and a third fan means for withdrawing a third portion of the air from the air outlet of said cyclone, the air flow drawn by said first, second, and third fan means being greater than the air flow through said first, second and third air inlet means.

* * * * *